US006593416B2

(12) United States Patent
Grootaert et al.

(10) Patent No.: US 6,593,416 B2
(45) Date of Patent: Jul. 15, 2003

(54) FLUOROPOLYMERS

(75) Inventors: Werner M. A. Grootaert, Oakdale, MN (US); William D. Coggio, Kastl (DE); Klaus Hintzer, Woodbury, MN (US); Robert E. Kolb, Afton, MN (US); Gernot Löhr, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/841,615

(22) Filed: Apr. 24, 2001

(65) Prior Publication Data

US 2002/0013438 A1 Jan. 31, 2002

Related U.S. Application Data

(63) Continuation-in-part of application No. 09/495,600, filed on Feb. 1, 2000.

(51) Int. Cl.[7] .......................... C08K 5/50; C08K 5/19; C08F 214/18; C08F 214/22
(52) U.S. Cl. ..................... 524/545; 524/115; 524/154; 524/544; 524/186; 525/387; 526/242; 526/255
(58) Field of Search .............. 525/387; 526/242, 526/255; 524/545, 544, 115

(56) References Cited

U.S. PATENT DOCUMENTS

| | | | |
|---|---|---|---|
| 2,559,752 A | 3/1951 | Berry | |
| 4,035,565 A | 7/1977 | Apotheker et al. | 526/249 |
| 4,132,845 A | 1/1979 | Covington, Jr. et al. | 528/499 |
| 4,233,421 A | 11/1980 | Worm | 525/343 |
| 4,281,092 A | 7/1981 | Breazeale | 526/247 |
| 4,282,162 A | 8/1981 | Kuhls | 260/408 |
| 4,564,662 A | 1/1986 | Albin | 526/247 |
| 4,728,680 A | 3/1988 | Hahn, Jr. | 523/310 |
| 4,745,165 A | 5/1988 | Arcella et al. | 526/247 |
| 4,758,618 A | 7/1988 | Ito et al. | 524/430 |
| 4,912,171 A | 3/1990 | Grootaert et al. | 525/343 |
| 5,041,480 A | 8/1991 | Kawachi et al. | 524/186 |
| 5,077,359 A | * 12/1991 | Moore | 526/206 |
| 5,086,123 A | 2/1992 | Guenthner et al. | 525/276 |
| 5,262,490 A | * 11/1993 | Kolb et al. | 525/343 |
| 5,268,405 A | 12/1993 | Ojakaar et al. | 524/366 |
| 5,285,002 A | 2/1994 | Grootaert | 526/222 |
| 5,378,782 A | 1/1995 | Grootaert | 526/255 |
| 5,463,021 A | 10/1995 | Beyer et al. | 528/482 |
| 5,565,512 A | 10/1996 | Saito et al. | 525/340 |
| 5,591,804 A | 1/1997 | Coggio et al. | 525/276 |
| 5,677,389 A | 10/1997 | Logothetis et al. | 525/340 |
| 5,708,131 A | 1/1998 | Morgan | 528/481 |
| 5,910,552 A | 6/1999 | Saito et al. | 526/247 |

FOREIGN PATENT DOCUMENTS

| | | |
|---|---|---|
| DE | A 20 44 986 | 5/1975 |
| DE | 22 35 885 | 5/1976 |
| DE | 197 13 806 | 10/1997 |
| DE | 100 04 229.5 | 2/2000 |
| EP | 0 140 207 A2 | 5/1985 |
| EP | 0 084 837 B1 | 8/1989 |
| EP | 0 226 668 B1 | 1/1992 |
| EP | 0 460 284 B1 | 5/1995 |
| EP | 0 661 304 A1 | 7/1995 |
| EP | 0 769 521 A1 | 4/1997 |
| EP | 0 784 064 A1 | 7/1997 |
| EP | 0 708 797 B1 | 2/1998 |
| JP | 08059940 | 3/1996 |
| WO | WO 90/14368 | 11/1990 |
| WO | WO 95/02634 | 1/1995 |
| WO | WO-A-99/62830 | 6/1998 |
| WO | WO-A-99/63858 | 6/1998 |
| WO | WO 99/48939 | 9/1999 |
| WO | WO-00/09603 | 2/2000 |
| WO | WO 01/02448 | 1/2001 |
| WO | WO 01/27194 | 4/2001 |

OTHER PUBLICATIONS

Pending application Ser. No. 60/233,383, Filed Sep. 18, 2000, Inventors: Werner M.A. Grootaert, Robert E. Kolb and Klaus Hintzer; 21 pages.

Pending application Ser. No. 60/233,386, Filed Sep. 18, 2000, Inventors: Werner M.A. Grootaert, Robert E. Kolb and Klaus Hintzer; 19 pages.

Pending application Ser. No. 60/265,498, Filed Jan. 31, 2001, Inventors: Robert E. Kolb and Werner M.A. Grootaert, 31 pages.

"Modern Fluoropolymers", *High Performance Polymers for Diverse Applications*, edited by John Scheirs, John Wiley & Sons (1977), esp. pp. 225–227, 224–225, and 351.

"Modern Fluoropolymers", *High Performance Polymers for Diverse Applications*, edited by John Scheirs, John Wiley & Sons (1997) especially pp. 223–270, 301–310, 373–396, 233–237 and 351.

"Nonionic Surfactants", edited by M. J. Schick, Marcel Dekker, Inc., New York, 1967.

* cited by examiner

*Primary Examiner*—Fred Zitomer
(74) *Attorney, Agent, or Firm*—James V. Lilly; Brian E. Szymanski

(57) ABSTRACT

Curable fluoroelastomer compositions having improved compression set after curing are provided, as well as compositions that are of relatively high purity. These compositions include a hydrogen-containing fluoroelastomer having interpolymerized units derived from a cure-site monomer, a curative (optionally with a co-agent), and an organo-onium. When the fluoroelastomer contains units derived from vinylidene fluoride, the composition is essentially free from an inorganic acid acceptor. Methods of improving the compression of cured fluoroelastomer and cured fluoroelastomers having improved compression set are also provided.

11 Claims, No Drawings

FLUOROPOLYMERS

This application is a continuation-in-part of U.S. application Ser. No. 09/495,600, filed Feb. 1, 2000, now pending.

FIELD OF THE INVENTION

The present invention relates to fluoropolymers, especially elastomeric fluoropolymers (i.e., fluoroelastomers), compositions incorporating such fluoropolymers, articles employing such fluoropolymers, and methods of making and using such fluoropolymers.

BACKGROUND

Cured compositions containing fluoropolymers are desirable for a number of applications. For example, they can be used as gaskets and O-rings. Such shaped articles having good compression set (i.e., little or no deformation of the cured article after a load is applied and removed) are particularly desirable.

Also, high purity fluoropolymers are used in a number of industries. They are especially preferred for use in the electronic, semiconductor, optical, medical, and pharmaceutical industries, to name a few. These polymers have a relatively low level of water extractable metals and metal compounds.

Inorganic acid acceptors are often added to fluoroelastomers utilizing peroxide cure systems. Optionally, at least one metal compound selected from divalent metal oxides or divalent metal hydroxides is frequently blended with the fluoroelastomer during preparation or before it is cured. While the presence of such compounds improves the heat aging resistance and thermal stability of the polymer (see, for example, U.S. Pat. No. 5,077,359), the addition of such acid acceptors has a very detrimental effect on the content of ions and extractables of the resulting elastomer composition. EP Pat. No. B-708 797 discloses the use of peroxide-curable fluoroelastomers with a fluoropolymer micropowder filler for semiconductor applications. There is no disclosure of how the materials were purified; however, due to the fact that this process requires acid acceptors the overall ion content seems to be unsatisfactorily high. Other fluoroelastomers that include such inorganic acid acceptors include EP 0 140 207 and U.S. Pat. Nos. 4,233,421 and 4,912,171, for example.

SUMMARY OF THE INVENTION

The present invention provides curable fluoroelastomer compositions, cured compositions, which can be secured to (e.g., coated on) a substrate, cured articles (e.g., shaped articles), and methods. Preferably, the compositions of the present invention are particularly useful as shaped articles such as gaskets and O-rings. In certain aspects of the invention, the fluoroelastomer compositions have improved compression set after being cured. In certain other aspects of the invention, the fluoroelastomer compositions are of a relatively high purity.

Preferably, the curable fluoroelastomer compositions of the present invention have improved compression set after they are cured. These curable compositions include a fluoroelastomer having units derived from a cure-site monomer and capable of peroxide cure, a peroxide curative for the fluoroelastomer, optionally a co-agent for the curative, and a non-fluorine-containing organo-onium. The improvement in compression set can be demonstrated by a comparison of cured fluoroelastomers with and without the organo-onium present. Those fluoroelastomers that contain the organo-onium have surprisingly better compression set properties than those of a similar or the same fluoropolymer composition but not employing the organo-onium. That is, there is little or no deformation of the cured article after a load is applied and removed using the test procedure described in the Examples Section when the fluoroelastomers are made using an organo-onium compared to when they are not. Preferably, the curative used in this embodiment is a peroxide.

This improvement is believed to be achieved whether or not the fluoroelastomer is of relatively high purity, although high purity can be desirable. Thus, in one aspect, the present invention provides a relatively high purity polymer that is essentially free of inorganic acid acceptors, which are typically bases such as oxides and hydroxides of calcium, magnesium, zinc, lead, etc. In an alternative embodiment, a relatively high purity polymer is essentially free of all ions other than $NH_4^+$, $H^+$, and $OH^-$. In these embodiments, the fluoroelastomer includes one or more units derived from a hydrogen-containing monomer and one or more units derived from a cure-site monomer. When the hydrogen-containing monomer is a vinylidene fluoride, the curable fluoroelastomer composition is essentially free from one or more inorganic acid acceptors. The preferred high purity elastomeric fluoropolymer is a peroxide-curable elastomer, optionally having pendant nitrile groups.

In one embodiment, the present invention provides a curable fluoropolymer composition that includes: a hydrogen-containing fluoroelastomer having units derived from a cure-site monomer, wherein the fluoroelastomer is capable of peroxide cure; a peroxide curative; optionally, a co-agent for the curative; and a non-fluorine-containing organo-onium; with the proviso that when the hydrogen-containing fluoroelastomer includes one or more units derived from vinylidene fluoride, the composition is essentially free from one or more inorganic acid acceptors.

In another embodiment, the present invention provides a process for improving compression set of a cured fluoroelastomer. The method includes providing a curable fluoroelastomer composition and curing the curable composition. The curable fluoroelastomer composition includes: a fluoroelastomer having units derived from at least one monomer including a carbon-bonded hydrogen and units derived from a cure-site monomer, wherein the fluoroelastomer is capable of peroxide cure; a peroxide curative; optionally, a co-agent for the curative; and a non-fluorine-containing organo-onium; with the proviso that when the hydrogen-containing fluoroelastomer includes one or more units derived from vinylidene fluoride, the composition is essentially free from one or more inorganic acid acceptors.

In yet another embodiment, the present invention provides a cured fluoroelastomer that includes the reaction product of a curable composition including: a hydrogen-containing fluoroelastomer having units derived from a cure-site monomer, wherein the fluoroelastomer is capable of peroxide cure; a peroxide curative; optionally, a co-agent for the curative; and a non-fluorine-containing organo-onium; with the proviso that when the hydrogen-containing fluoroelastomer includes one or more units derived from vinylidene fluoride, the composition is essentially free from one or more inorganic acid acceptors.

As used herein, the terms "a," "an," "the," "one or more," and "at least one" are used interchangeably.

DETAILED DESCRIPTION OF PREFERRED EMBODIMENTS OF THE INVENTION

The present invention provides curable fluoropolymer compositions that include a hydrogen-containing fluoroelastomer having units derived from a cure-site monomer, a curative, and an organo-onium. Optionally, the compositions can include a co-agent for the curative and a partially crystalline fluoropolymer (e.g., fluorothermoplast or other fluoropolymer such as polytetrafluoroethylene) as a filler. Certain embodiments of the present invention are directed to polymers that have improved compression set and certain embodiments of the present invention are directed to polymers that have relatively high purity (i.e., polymers that are essentially free of ions other than $NH_4^+$, $H^+$, and $OH^-$ and/or essentially free of inorganic acid acceptors).

The cured fluoroelastomer preferably has improved compression set relative to the same cured fluoroelastomer made without the organo-onium. Herein, an "improvement" is a decrease in the residual deformation reported as a percentage compression set as determined by the test method described in the Examples Section. Preferably, the compression set is less than about 20%, more preferably, less than about 15%, even more preferably, less than about 10% and most preferably, zero.

In cases where improved compression set is desired, the addition of organo-onium compounds are beneficial to improve properties in formulations that do not contain inorganic acid acceptors; however, the improvement in compression set may be achieved in the fluoroelastomers even if they are not essentially free of inorganic acid acceptors and ions different than $NH_4^+$, $H^+$ and $OH^-$.

Fluoropolymers

The fluoroelastomers used in the invention are not perfluorinated. That is, they include units derived from at least one monomer with hydrogen bonded to a carbon atom such that they are "hydrogen-containing." They include interpolymerized units derived from a cure-site monomer. The fluoroelastomers may or may not include one or more units derived from vinylidene fluoride. Preferably, the fluoroelastomers are essentially free of units derived from vinylidene fluoride. By "essentially free from units derived from vinylidene fluoride" it is meant that the fluoroelastomer contains less than 10%, preferably less than 5%, more preferably 0%, by weight of such units. Furthermore, the composition may or may not include one or more inorganic acid acceptors. If the fluoroelastomer includes one or more units derived from vinylidene fluoride, the composition is essentially free from one or more inorganic acid acceptors.

The fluoropolymer (including flouroelastomers and fluorothermoplasts), preferably a fluoroelastomer, is typically a polymerized product of one or more fluoroolefin monomers and optionally one or more hydrocarbon olefin monomers. Generally, the fluoroolefin monomers have from 2 to 8 carbon atoms. Examples of such fluoroolefin monomers include tetrafluoroethylene (TFE), vinylidene fluoride ($VF_2$), hexafluoropropylene (HFP), trifluoroethylene, chlorotrifluoroethylene (CTFE) and fluorinated ethers such as perfluoroalkyl vinyl ethers (VE). Examples of useful hydrocarbon olefins include ethylene and/or propylene.

The fluoropolymers are also derived from a cure-site monomer. Examples of useful "cure site monomers" include bromine, iodine, or nitrile groups, which can provide "cure sites" for curing the fluoropolymer.

In case of peroxide-curable fluoroelastomers, bromine-containing cure site comonomers are preferred such as a bromine-containing olefin, preferably containing another halogen such as fluorine. Examples are bromotrifluoroethylene, 4-bromo-3,3,4,4-tetrafluorobutene-1 and a number of others noted in U.S. Pat. No. 4,035,565. Brominated fluorovinyl ethers useful in the invention include $CF_2Br-R_f-O-CF=CF_2$, wherein $R_f$ is a fully fluorinated alkylene of up to 4 carbons atoms like $-CF_2-$, such as $CF_2BrCF_2OCF=CF_2$, cited in U.S. Pat. No. 4,745,165 and of the type $ROCF=CFBr$ or $ROCBr=CF_2$ where R is a lower alkyl group or fluoroalkyl group each having up to 4 carbon atoms, such as $CH_3CF=CFBr$ or $CF_3CH_2OCF=CFBr$, cited in U.S. Pat. No. 4,564,662. The choice of bromine-containing units is based on copolymerizability with the major monomers and low branching tendency, in addition to cost and availability (U.S. Pat. No. 5,077,359).

Nitrile-containing cure site monomers may also be used. Preferred examples are nitrile-containing fluorinated olefins and nitrile-containing fluorinated vinyl ethers, such as $CF_2=CFO(CF_2)_mCN$, $CF_2=CFO[CF_2CF(CF_3)O]_q(CF_2O)_s$ $CF(CF_3)CN$, $CF_2=CF[OCF_2CF(CF_3)]_rO(CF_2)_tCN$, where, in reference to the above formulaes m=2 to 12, q=0 to 4, r=1 to 2, s=0 to 6 and t=1 to 4. Representative examples of such a monomer include perfluoro(8-cyano-5-methyl-3,6-dioxa-1-octene), $CF_2=CFO(CF_2)_5CN$, $CF_2=CFO(CF_2)_3OCF$ $(CF_3)CN$, $CF_2=CF-O-(CF_2)_4-O-CF(CF_3)CN$, and $CF_2=CF-O-(CF_2)_3-CN$.

The optional partially crystalline fluoropolymer can be used as a filler. In contrast to amorphous fluoroelastomers, partially crystalline fluoropolymers are polymers with melting points (typically, from 100° C. to 340° C.). The partially crystalline fluoropolymers used in the invention can be used in the form of their dispersions, i.e., the mixtures of the fluoroelastomers and fillers may be prepared by blending the latexes of the materials. Such dispersions can contain low molecular weight polytetrafluoroethyene (PTFE), the so-called micropowders or waxes (as described in U.S. Pat. No. 3,956,000) optionally modified with HFP and/or VE. The dispersions comprise melt-processable copolymers of TFE and perfluoro(propyl-vinyl) ether known as "PFA", melt processable copolymers of TFE and HFP, which is known as "FEP", also partially crystalline polymers of TFE and ethylene (ET), which is known as "ETFE", or TFE, HFP and $VF_2$, which is known as "THV". These copolymers are extensively described in "Modern Fluoropolymers", High Performance Polymers for Diverse Applications, edited by John Scheirs, John Wiley & Sons (1997), especially pages 223–270, 301–310, and 373–396. Preferably, the partially crystalline fluoropolymers used as fillers have melting points higher than the processing temperature of the mixture.

Highly Pure Fluoropolymer Compositions

One aspect of the invention provides curable fluoroelastomer compositions and cured polymers that are preferably essentially free of inorganic acid acceptors and salts from coagulation. As used herein, "essentially free" means less than 1000 parts per million (ppm), and preferably less than 500 ppm. Such curable compositions and the resultant cured products have a relatively high purity.

In another aspect of the invention, there is provided curable compositions and cured products that are essentially free of all water extractable ions other than $NH_4^+$, $H^+$ and $OH^-$ and more preferably, essentially free of all water extractable ions except $H^+$ and $OH^-$, which are typically present in the latex as a result of the polymerization process. Examples of such ions include perfluorooctanoate, sulfate, chloride, fluoride, etc. As used in this context, "essentially free" means that less than 1000 ppm, preferably less than 500 ppm, anions and cations (other than $NH_4^+$, $H^+$ and $OH^-$) are found in the fluoropolymer (before adding cure chemicals and other ingredients). Such curable compositions and the resultant cured products have a relatively high purity.

Typically, inorganic acid acceptors are not added to the process, and thus do not need to be removed. Removal of ions can be performed by dialysis, preferably, ion exchange. An ion exchange process is disclosed in, e.g., U.S. Pat. Nos. 4,282,162 and 5,463,021 and DE-A-20 44 986. Other processes are disclosed in WO-A-99/62830 and WO-A-99/62858. A detailed discussion of certain purification processes is presented below.

A preferred process of manufacturing fluoroelastomer compounds that are essentially free of ions includes: purifying an aqueous fluoroelastomer latex (or a blend of aqueous fluoroelastomer latex and a latex of a partially crystalline fluoropolymer—if a fluoropolymer filler is required) by using separately a cationic and subsequently an anionic exchange treatment, or vice versa, and coagulating the purified latex by using salt-free methods.

Preparation of Fluoropolymers

The fluoropolymers (e.g., fluoroelastomers and partially crystalline fluoropolymers), preferably fluoroelastomers, can be prepared by known methods, preferably, by an aqueous emulsion polymerization process. In this process, an aqueous colloidal dispersion (i.e., latex) is obtained by polymerizing fluorinated monomers in an aqueous medium containing a relatively high amount of fluorinated emulsifiers such as salts of perfluoro octanoic acid and the like with mild agitation. This process is described in detail in "Modem Fluoropolymers", High Performance Polymers for Diverse Applications, edited by John Scheirs, John Wiley & Sons (1997), especially pages 233–237.

Emulsion polymerization is to be distinguished from the suspension polymerization process. The latter method uses little or no emulsifier and requires vigorous agitation that results in a granular product. Usually emulsion polymerization is carried out within a pressure range of 5 bar to 30 bar ($5\times10^5$ to $3\times10^6$ Pa) and within a temperature range of 5° C. to 100° C. Generally, emulsion polymerization processes use significant amounts of adjuvants, such as emulsifiers, initiators, buffers, etc., although a preferred polymerization process includes a minimum level of adjuvants like buffers (and preferably, no buffer).

It is generally accepted that a prerequisite for an aqueous emulsification is the use of a non-telogenic emulsifier (U.S. Pat. No. 2,559,752). As noted above, fluorinated emulsifiers, most often perfluorinated alkanoic acids, are used. Generally, they are used in an amount of from 0.02% by weight to 3% by weight with respect to the polymer (i.e., based on the total weight of the polymerizable composition).

A further material used in the polymerization process is a water soluble initiator to start the polymerization. Commonly, salts of peroxo-sulfuric acids are applied, often in the presence of further co-agents like bisulfites or sulfinates (U.S. Pat. Nos. 5,285,002 and 5,378,782) or the sodium salt of hydroxymethane sulfinic acid (available under the trade designation RONGALIT from BASF, Ludwigshafen, Germany). All of these initiators and the emulsifiers have an optimum pH-range where they show most efficiency. For this reason, buffers are typically used. The buffers include phosphate, acetate, or carbonate buffers, or any other acid or base such as ammonia or alkali metal hydroxides. The concentration range for the initiators and buffers can vary from 0.05% by weight to 5% by weight, based on the aqueous polymerization medium.

Removal of Ions

The removal of the ions from the corresponding dispersions used during polymerization is preferably achieved by using cation and anion exchangers. It is a preferred way to remove first the anions (such as perfluorooctanoate, sulfate, chloride, fluoride, etc.) from the dispersions. The removal of the anions via anion exchangers is an important step for the following reasons: the latex particles have a submicroscopic diameter of less than 400 nm; the latex particles are anionically stabilized in the sense of colloid chemistry; the anionic stabilization is provided by anionic endgroups, mostly —COOH and —OSO$_3$H groups, and by the adsorbed anionic emulsifier such as PFOA. Such anionically stabilized dispersions tend to coagulate readily in an anion exchange bed and thus jam the ion exchange bed. Therefore, the treatment of an anionically stabilized dispersion with an anion exchanger is considered to be technically not feasible, in particular at higher concentrations.

The impairing or clogging of the anion exchange bed is already observed at solid contents 1000 times lower than those of the raw polymer dispersions, i.e., the dispersion after polymerization. This coagulation does not occur in the presence of a nonionic emulsifier usually in the range of 0.001 to 3.0% by weight of solid content as described in International Publication Nos. WO 99/62830 and WO 99/62858. Nonionic emulsifiers are described in detail in "Nonionic Surfactants" edited by M. J. Schick, Marcel Dekker, Inc., New York, 1967.

The choice of the nonionic emulsifier is not critical. Alkyl aryl polyethoxy alcohols, alkyl polyethoxy alcohols, or other nonionic emulsifier may be used. Preferred nonionic surfactants are alkyl aryl polyethoxy alcohol type such as that available under the trade designation TRITON X 100 from Rohm & Haas, or alkyl polyethoxy alcohol type such as that available under the trade designation GENAPOL X 080 from Clariant GmbH.

The choice of the ion exchange resin is not very critical. Usable anion exchange resins include those commercially available under the trade designations AMBERLITE IRA 402 and AMBERJET 4200 from Rohm and Haas, PUROLITE A 845 from Purolite GmbH, LEWATIT MP-500 from Bayer AG, and DOWEX 1X–2X series from Dow Chemical.

The specific basicity of the anion exchanger used is not very critical. Weakly, medium and strongly basic resins can be used. Preferably, the ion exchange resin is transformed to the OH$^-$ form.

The flow rate is not very critical, standard flow rates can be used. The flow can be upward or downward. The ion exchange process can also be carried out as a batch process by mildly stirring the dispersion with the ion exchange resin in a vessel. After this treatment the dispersion is isolated by filtration.

The removal of the anions is preferably carried out with raw dispersions from the polymerization. Such dispersions generally have a solid content of 10% by weight to 40% by weight, to which is added sufficient nonionic emulsifier to provide dispersion stability and, if necessary, to decrease the solid content to less than about 20%. In a subsequent step the cations are removed by using readily available resins like LEWATIT SP 112 (Bayer AG), preferably in the H$^+$-form. The use of mixed ion exchange resins (which have anion and cation exchange groups) is a possibility, too.

Preparation of Fluoropolymer Latex

Following removal of the ions, the fluoropolymer is preferably coagulated from the latex without the addition of ions. This can be effected by the known freeze-coagulation process as described in U.S. Pat. No. 5,708,131. During this process the whole aqueous latex is frozen and the polymer is coagulated. This process can be performed batchwise or continuously. While the isolated polymer is already clean some subsequent washing steps with water may be beneficial.

Another process for coagulation without the addition of ions is the so-called mechanical coagulation process, which is disclosed in U.S. Pat. No. 5,463,021 for fluorothermoplasts. The fluorothermoplast dispersions are first compressed to pressures up to 200 bar to 400 bar ($2 \times 10^7$ to $4 \times 10^7$ Pascals) and then decompressed through nozzles or slits and thereby the coagulation is achieved. The high pressures are produced by a so-called homogenizer. This technology does not work for elastomer dispersions due to clogging and jamming the equipment. As suggested in DE 100 04 229.5 (filed Feb. 1, 2000) these difficulties can be overcome by generating high pressures with pressurized gases from 50 bar to 400 bar ($5 \times 10^6$ Pa to $4 \times 10^7$ Pa). In contrast to the process disclosed in U.S. Pat. No. 5,463,021 the coagulation by this technique appears to be brought about by the rapid expansion of the dissolved gas, preferably via a nozzle. The preferred gases for use with this process are nitrogen, air, or $CO_2$.

In yet another coagulation process a volatile water-miscible organic solvent effects the coagulation. The solvent is selected from the group consisting of alkanols of 1 to 4 carbon atoms and ketones of 2 or 3 carbon atoms. Such solvents should not have a significant swelling effect on the polymer to prevent the coagulated or agglomerated polymer from becoming too sticky and difficult to process.

Mechanical and thermal methods for coagulating polymers are disclosed in U.S. Pat. No. 5,463,021, and EP Pat. Nos. B-0 084 837, B-0 226 668, and B-0 460 284.

After being coagulated the fluoropolymer may be dewatered. One method of dewatering the polymer is by mechanical dewatering. This process is described in U.S. Pat. No. 4,132,845. The wet polymers can be dried, usually at a temperature within a range of 110° C., preferably 150° C., to 250° C., in the presence of a carrier gas like air or nitrogen.

The elastomers with incorporated polymer fillers can be prepared by blending the solids as described in EP-B-0-708 797 or by blending latices or rubbers or both either before ion exchange treatment or thereafter. The latex blend method ensures the most uniform distribution of the polymer filler and avoids any contamination as compared to dry blending. After latex blending, the blends may be coagulated, dewatered, and dried as described above.

It is important to avoid the known coagulation chemicals like salts such as sodium or magnesium chloride or mineral acids since especially with regard to fluoroelastomers the coagulated products tend to be sticky and to clump together. Therefore, despite thorough washing the dried product still contains significant amounts of such added coagulation chemicals and of salts present in the polymerization recipe.

Curable Fluoropolymer Compositions

The present invention provides fluoropolymer compositions for coating articles by contacting the article with a coating composition containing the fluoropolymer and immediately after this coating step or at some later time optionally the coating will be cured to yield an article with excellent surface properties. The invention also provides shaped articles prepared from the fluoropolymers and especially fluoroelastomers, in the latter case by subsequent curing of the article.

A preferred curable fluoropolymer composition includes a peroxide-curable fluoroelastomer essentially free of ions other than $NH_4^+$, $H^+$ and $OH^-$, and, based on the elastomeric polymer less than 5.0 parts per one hundred parts of fluoropolymer resin (phr) of an organic peroxide, less than 10.0 phr of co-agent, and less than 50 phr of a partially crystalline fluoropolymer essentially free of ions.

Another preferred curable fluoropolymer composition includes a peroxide-curable fluoroelastomer and from 0.5 phr to 3 phr of an organic peroxide, from 1 phr to 7 phr of a co-agent, and from 10 phr to 40 phr of a partially crystalline fluoropolymer.

Yet another preferred curable fluoropolymer composition includes: a peroxide-curable nitrile group containing fluoroelastomer essentially free of ions other than $NH_4^+$, $H^+$ and $OH^-$, and, based on the elastomer polymer, less than 5 phr (preferably from 0.05 phr to 2 phr) of an ammonia generating cure system, and less than 50 phr (preferably from 10 phr to 40 phr) of a partially crystalline fluoropolymer essentially free of such ions.

For a peroxide-curable fluoroelastomer, then the cure-site monomer includes the bromine- or iodine- or nitrile-containing monomers described above. A peroxide-curable fluoroelastomer is especially useful in a curing composition containing an organic peroxide, a co-agent and, optionally, a fluoropolymer filler.

When the peroxide-curable fluoroelastomer contains a nitrile cure-site monomer, it may be cured by using the techniques described in U.S. Pat. Nos. 5,677,389, 5,565,512, and 4,281,092, and International Publication No. WO 00/09603. If the fluoropolymer contains a nitrile group it is especially useful in a composition containing an ammonia generating catalyst. See, for example, U.S. Pat. Nos. 5,677,389 and 5,565,512, and International Publication No. WO 00/09603.

Additional cure systems which may be used with copolymers containing the above-mentioned nitrile cure-site monomers include those described in copending applications with U.S. Ser. Nos. 60/265,498, 60/233,386 and 60/233,383. These may be used as a replacement for or in combination with the ammonia generating cure system discussed above.

A widely used cure-system comprises polyol compounds in the presence of onium compounds (U.S. Pat. Nos. 4,233,421, 4,912,171, and 5,262,490), which adds further ion loadings to the finished article. For the manufacture of electronic components, such as semiconductor devices, unusually stringent requirements exist for sealing compounds. Apparently, fluoroelastomers cured by known processes cannot meet such requirements.

The peroxide-curable elastomers are cured by a free radical process. A curable composition includes a fluoropolymer and a peroxide to generate free radicals at the desirable curing temperatures. A dialkyl peroxide, which decomposes at a temperature above 50° C., is especially preferred when the composition is to be processed at elevated temperatures before it is cured. In many cases one will prefer to use a di-tertiarybutyl peroxide having a tertiary carbon atom attached to peroxy oxygen. Among the most useful peroxides of this type are 2,5-dimethyl-2,5-di(tertiarybutylperoxy)-hexyne-3 and 2,5-dimethyl-2,5-di(tertiarybutylperoxy)-hexane. Other peroxides can be selected from such compounds as dicumyl peroxide, dibenzoyl peroxide, tertiarybutyl perbenzoate, and di[1,3-dimethyl-3-(tertiarybutylperoxy)-butyl]carbonate.

Another material which is usually blended with the composition before it is made into end products is a co-agent composed of a polyunsaturated compound that is capable of cooperating with the peroxide to provide a useful cure. These crosslinking co-agents can be added in an amount equal to 0.5 to 10%, preferably about 1 to 7%, by weight of the copolymer content, and may be one or more of the following compounds: triallyl cyanurate; triallyl isocyanurate; tri(methallyl)-isocyanurate; tris(diallylamine)-s-triazine; triallyl phosphite; N,N-diallyl acrylamide; hexaallyl phosphoramide; N,N,N',N'-tetraallyl terephthalamide, N,N,N',N'-tetraallyl malonamide; trivinyl isocyanurate; 2,4, 6-trivinyl methyltrisiloxane; and tri(5-norbornene-2-methylene) cyanurate. Particularly useful is triallyl isocyanurate (see, U.S. Pat. No. 5,077,359).

As discussed above, inorganic acid acceptors are often added during the peroxide cure step to improve the heat aging resistance and thermal stability of the polymer; however, the addition of such acid acceptors would have a very detrimental effect to the ion content and extractables of the resulting elastomer composition. Thus, for the curing of the peroxide-curable fluoroelastomers of the present invention, with or without polymeric filler, it is not necessary to add further any kind of acid acceptors for obtaining excellent cure characteristics and physical properties and articles with low ion contents.

In cases where improved compression set is desired, the addition of organo-onium compounds are beneficial to improve properties in formulations that do not contain inorganic acid acceptors; however, the improvement in compression set may be achieved in the fluoroelastomers even if they are not essentially free of inorganic acid acceptors and ions different than $NH_4^+$, $H^+$ and $OH^-$. The organo-onium compounds can be selected from a large variety of compounds in such a way to meet the specific requirements of various application fields.

As noted above, the fluoroelastomers utilized in these curable compositions not only contain a cure-site monomer, they are also preferably essentially free from units derived from vinylidene fluoride units. In achieving this improvement in compression set the fluoroelastomer is combined with (a) an appropriate curative in amounts and types such as is described above, optionally (b) a co-agent for the curative in amounts and types such as is described above, and (c) an organo-onium in amounts and types such as described hereinafter.

Organo-onium compounds represent one class of useful additives to the fluoroelastomer compositions of the invention. Suitable organo-onium compounds are known in the art, generally as vulcanization accelerators for the elastomers cured by dihydroxy-containing curing agents. As it is known, an organo-onium is the conjugate acid of a suitable Lewis-base (e.g., phosphine, amine, ether, and sulfide) and can be formed by reacting said Lewis-base with a suitable alkylating agent (e.g., an alkyl halide or aryl halide). The organo-onium compounds contain at least one heteroatom such as N, P, S, or O bonded to organic or inorganic moieties. Preferably, they do not include fluorine atoms (i.e., they are non-fluorine-containing organo-oniums). One particularly useful class of the quaternary onium compounds broadly comprises relatively positive and negative ions wherein phosphorus and nitrogen generally comprise the central atom of the positive ion and the negative ion may be an organic or inorganic anion (e.g., halide, sulfate, acetate, phosphate, hydroxide, alkoxide, phenoxide).

Organo-onium compounds, preferably, non-fluorine-containing organo-onium compounds, suitable for use in the compositions of the present invention are described in U.S. Pat. Nos. 4,233,421; 4,912,171; and 5,262,490. Examples include triphenylbenyl phosphonium chloride, tributyl alkyl phosphonium chloride, tributyl benzyl ammonium chloride, tetrabutyl ammonium bromide, and triarylsulfonium chloride. Another class of organo-onium compounds are represented by the following formula:

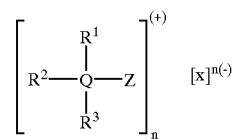

wherein

Q is nitrogen or phosphorus;

Z is a hydrogen atom or is a substituted or unsubstituted, cyclic or acyclic alkyl group having from 4 to about 20 carbon atoms that is terminated with a group of the formula —COOA where A is a hydrogen atom or is a $NH_4^+$-cation or Z is a group of the formula $CY_2$—COOR' where Y is a hydrogen or halogen atom, or is a substituted or unsubstituted alkyl or aryl group having from 1 to about 6 carbon atoms that may optionally contain one or more catenary heteroatoms and where R' is a hydrogen atom, a $NH_4^+$-cation, an alkyl group, or is an acyclic anhydride, e.g. a group of the formula —COR where R is an alkyl group or is a group that itself contains organo-onium (i.e. giving a bis-organo-onium); preferably R' is hydrogen; Z may also be a substituted or unsubstituted, cyclic or acyclic alkyl group having from 4 to about 20 carbon atoms that is terminated with a group of the formula —COOA where A is a hydrogen atom or is a $NH_4^+$-cation;

$R^1$, $R^2$ and $R^3$ are each, independently, a hydrogen atom or an alkyl, aryl, alkenyl, or any combination thereof; each $R^1$, $R^2$ and $R^3$ can be substituted with chlorine, fluorine, bromine, cyano, —OR" or —COOR" where R" is a $C_1$ to $C_{20}$ alkyl, aryl, aralkyl, or alkenyl, and any pair of the $R^1$, $R^2$ and $R^3$ groups can be connected with each other and with Q to form a heterocyclic ring; one or more of the $R^1$, $R^2$ and $R^3$ groups may also be a group of the formula Z where Z is as defined above;

x is an organic or inorganic anion (e.g. halide, sulfate, acetate, phosphate, phosphonate, hydroxide, alkoxide, phenoxide or bisphenoxide); and n is a number equal to the valence of the anion X.

Also useful as additives to the fluorinated elastomeric composition are phosphates, phosphine oxides, and amine oxides. These compounds include, for example, alkyl and aryl phosphate, triaryl phosphine oxides, trialkyl phosphine oxide, triarylamine oxide and trialkyl amine oxide. Such compounds include those of the formula $PR_3O$ and $NR_3O$ where each R substituent is, independently, a linear or branched alkyl or aryl group.

Nitrile-containing polymers may be cured by a catalytic interaction of alkyl tin compounds with the nitrile group, thereby creating a triazine crosslinked structure ("Modern Fluoropolymers", High Performance Polymers for Diverse Applications, edited by John Scheirs, John Wiley & Sons (1997), especially page 351). The addition of tin compounds, however, also detrimental to the ion level of the elastomer. It is an aspect of the invention to preferably cure the purified nitrile elastomer blends in the presence of ammonia-generating compounds that are solid or liquid at ambient conditions and generate ammonia under curing conditions. Such compounds include, for example, hexamethylene tetramine (urotropin), dicyan diamid, and substituted and unsubstituted triazine derivatives represented by the formula:

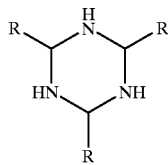

wherein R is a hydrogen or a substituted or unsubstituted alkyl, aryl or aralkyl group having from 1 to about 20 carbon atoms. Specific useful triazine derivatives include hexahydro-1,3,5-s-triazine and acetaldehyde ammonia trimer.

Objects and advantages of this invention are further illustrated by the following examples, but the particular materials and amounts thereof recited in these examples, as well as other conditions and details, should not be construed to unduly limit this invention.

Experimental Section

Description of Materials Used

Anionic exchange resin, AMBERLITE IRA 402 (chloride form) was supplied by Rohm and Haas. The resin was put into the OH-form with a 5% NaOH solution. After the elution of the NaOH solution, the column is flushed with deionized water (DI).

Cationic exchange resin, LEWATIT SP 112 ($NH_4^+$ form) was supplied by Bayer AG. It was put into the $H^+$-form by an aqueous mineral acid such as sulfuric or hydrochloric acid. After treatment of the resin with the acid solution the column is rinsed with excess DI.

Dispersion Preparation

The fluoroelastomer and/or the partially crystalline fluoroplastic dispersion were prepared separately by emulsion polymerization. The desired mixtures thereof were prepared by blending the thus obtained dispersions. The solids content was adjusted to 20%. The requested amount of a nonionic surfactant is added in the form of a diluted solution. Practical levels of nonionic surfactant are in the range of 10 to 30,000 ppm of surfactant based on total weight of the dispersion mixture. Preferred ranges are from 10 to 100 ppm. Typical nonionic surfactants are, for example TRITON 100 X or GENAPOL X 080.

Column Ion Exchange Process

The cationic and anionic exchange processes are similar. The polymer latex is ion exchanged by passing the dispersion through a column packed with the desired exchange resin (dimension of the column: diameter 6 cm, height 30 cm). The latex can be delivered to the column by any means typical for a chromatographic procedure, e.g. gravity feed, static siphon or an automatic pumping system. The particular method used to pass the dispersion through the column is not critical. The elution rate should not exceed 3 times the bed volume/hour.

Analytical Test Methods

PFOA concentrations were determined from dispersion samples taken before and after ion exchange. The PFOA level was determined by gas chromatography according to standard methods (WO-A-99/62830 and WO-A-99/62858). The concentrations of $F^-$, $Cl^-$, $Br^-$, $SO_4^{2-}$, $PO_4^{3-}$ were determined by ion chromatography of the "mother liquor" which is the particle free aqueous phase of the dispersion as obtained by freeze coagulation. The cation contents of the samples were determined by ion conductive plasma (ICP) of the polymer samples. Samples were treated with $HNO_3$ followed by pyrolysis at 550° C. for 10 minutes in a sealed pyrolysis bomb before subjecting them to ICP.

Test Methods

In the following examples, indicated results were obtained using the following test methods:

Press-cure samples. Unless otherwise noted, 150×150×2.0 mm sheets were prepared by pressing at about 6.9 Mega Pascals (MPa) for 10 minutes at 177° C. for measuring physical properties.

Post-cure samples, unless otherwise noted, were prepared by placing a press-cured sample in a circulating air oven. The oven was maintained at 232° C. and the samples treated for 16 hours.

Tensile strength at break, elongation at break, and modulus at 100% elongation were determined using ASTM D 412-92 on samples cut from the press-cure or post-cure sheet with ASTM Die D. Units reported in MPa.

Hardness was determined using ASTM D 2240-85 Method A with a Type A-2 Shore Durometer.

Compression set was determined on O-rings using ASTM 395-89 Method B. The O-rings had a cross-section thickness of 3.5 mm (0.139 inch). After post-curing, the O-rings were compressed for 70 hours at 200° C. Results are reported as a percentage of permanent set. The melt flow index (MFI) was determined according to ISO 12086. Mooney viscosities were measured according to ASTM D-1646. All percentages are by weight unless otherwise stated.

Procedure for Anionic Exchange

Five kilograms (kg) of a dispersion with a solids content of 28.5% is diluted to 18% solids with deionized water (DI). Seventy-five grams (g) of a 20% solution of GENAPOL X 080 in DI is added to this mixture and stirred slowly over night. The dispersion is subjected to anionic exchange by passing the dispersion through a 600 ml column packed with 400 ml of the anionic exchange resin prepared as described above. The elution rate is adjusted to 600 ml dispersion/hour.

Procedure for Cationic Exchange

The dispersion after anionic exchange is treated in a similar manner with 400 ml of the cationic exchange resin. The polymer is isolated from the dispersion by freeze coagulation.

EXAMPLES 1 to 3

These samples demonstrate the purity of peroxide cured samples for different compositions with respect to the elastomer and the use of partially crystalline fluoropolymer fillers. The materials were purified according to the Anionic and Cationic exchange procedures as described above. The resins were recovered by freeze coagulation. Table 1 identifies the formulations used for the curing with and without organo-onium compounds and the curing performance. Table 2 lists some extraction datas of the cured materials and shows a very low content of extractible ions.

Example 1

Terpolymer of 31% $VF_2$, 37% HFP, 31% TFE, 1% bromotrifluoroethylene (BTFE), Mooney viscosity ML 1+10/121° C.=70.

Example 2

Mixture of 80% of a terpolymer from Example 1 and 20% of the PFA bipolymer (96% TFE, 4% PPVE), MFI 372° C., 5 kg=2.2 g/10 min.

Example 3

Mixture of 80% of an elastomer from Example 1 and 20% of a terpolymer: 20% HFP, 63% TFE, 17% ET, MFI 297° C., 5 kg=10.5 g/10 min.

TABLE 1

Compound formulation of ultra-clean materials and curing performance (all values expressed as parts per hundred parts of rubber (pphr))

| | Example designation | | | | |
|---|---|---|---|---|---|
| | 6(a) | 6(b) | 7(a) | 7(b) | 10 |
| | Pphr (rubber) | | | | |
| | 100 | 100 | 125 | 125 | 125 |
| Compound formulation | | | | | |
| On1 | | 0.75 | | 0.75 | |
| On2 | | | | | 1.5 |
| Triallyliso-cyanurate | 3.0 | 3.0 | 3.0 | 3.0 | 3.0 |
| 2,5-dimethyl-2,5-bis (tertiarybutyl-peroxy) hexane | 1.25 | 1.25 | 1.25 | 1.25 | 1.25 |
| Cure characteristics | | | | | |
| MDR 177° C. 0.5° Arc | | | | | |
| ML | 0.67 | 0.67 | 1.73 | 1.47 | 1.17 |
| MH | 6.00 | 6.91 | 6.47 | 9.83 | 8.61 |
| Ts-2 | 0.96 | 0.83 | 1.12 | 0.67 | 1.53 |
| Ts-50 | 1.04 | 0.95 | 1.62 | 0.83 | 1.63 |
| Ts-90 | 2.20 | 1.97 | 2.83 | 1.77 | 3.14 |
| Compression set 70 hours, 200° C., 3.5 mm (0.139 inch) O-rings | 46.7 | 20.9 | 39.4 | 24.8 | 40.4 |

All compositions contain 100 parts of elastomer, "125 parts" means 100 parts of elastomer+25 parts of filler.

(a) means compositions without and (b) with onium salt On1 or On2.

On1 is triphenylbenzyl phosphonium/chloride (neat).

On2 is Triphenylbenzyl phosphonium/chloride (neat)/ methanol 50% solution

Tests on fluoroelastomer compositions comprising carbon-bonded hydrogen atoms will also exhibit improved compression set results with the addition of organo-onium compounds, even for fluoroelastomers essentially free from vinylidene fluoride.

TABLE 2

Extraction data in ng/g of cured samples in ultra-pure water. Leaching volume: 250 ml, sample weight: 10 g cut-outs of sheets of 2 mm thickness, leaching time: 14 days at 85° C.

| | Example designation | | | |
|---|---|---|---|---|
| | 1(a) | 1(b) | 2(a) | 2(b) |
| Cations: *) | | | | |
| Potassium | 10 | 10 | 5 | 5 |
| Sodium | 20 | 30 | 15 | 5 |
| Anions: | | | | |
| Fluoride | 150 | 100 | 85 | 100 |
| Chloride | 5 | 20 | 10 | 20 |
| Bromide | 25 | 30 | 10 | 20 |

*) Al, Ca, Co, Cu, Fe, Mg, Ni, Zn, Sn, $NH_4^+$ are below detection limits.

EXAMPLES 4–6

Copolymers with the following compositions were used:

Example 4

Copolymer of 75 wt % TFE, 24 wt % Propylene and 1 wt % bromotrifluoroethylene(BTFE), Mooney viscosity (ML 1+10 at 121° C.) of 68;

Example 5

Terpolymer of 24% TFE, 42% HFP, 33% $VF_2$ and 1% BTFE, Mooney viscosity (ML 1+10 at 121° C.) of 50; and

Example 6

Copolymer of 24% TFE, 42% HFP, 33% $VF_2$ and 1% bromodifluoroethylene, Mooney viscosity (ML 1+10 at 121° C.) of 50.

The above copolymers are compounded with the ingredients listed in Table 3. The formulations used for the curing include examples with and without organo-onium compounds. Cure rheology results and compression set for each example are also listed.

TABLE 3

| | Example | | | | | |
|---|---|---|---|---|---|---|
| | 4a | 4b | 5a | 5b | 6a | 6b |
| | Fluoroelastomer (parts) | | | | | |
| | 100 | 100 | 100 | 100 | 100 | 100 |
| Formulation (listed as parts per hundred parts rubber-phr) | | | | | | |
| N990 | 30 | 30 | 30 | 30 | 30 | 30 |
| Triallylisocyanurate | 2.5 | 2.5 | 2.5 | 2.5 | 2.5 | 2.5 |
| 2,5-dimethyl-2,5-bis(tertiary butyl peroxy)hexane | 1.25 | 1.25 | 1.25 | 1.25 | 1.25 | 1.25 |
| Onium I | — | 1.5 | — | 1.5 | — | 1.5 |
| Cure characteristics | | | | | | |
| MDR 177° C. 0.5° Arc | | | | | | |
| $M_L$ | 1.70 | 1.15 | 1.02 | 0.75 | 1.42 | 1.13 |
| $M_H$ | 4.96 | 6.17 | 5.84 | 12.72 | 7.53 | 8.86 |
| $t_s2$ (min.) | 1.27 | 1.06 | 0.69 | 0.59 | 0.73 | 0.69 |
| t'50 (min.) | 1.50 | 1.27 | 0.79 | 0.83 | 0.90 | 0.94 |
| t'90 (min.) | 2.65 | 3.89 | 2.92 | 1.95 | 2.37 | 2.25 |
| Compression set (%) 70 hours, 200° C., 3.5 mm (0.139 inch) O-rings | 56.2 | 52.4 | 47.3 | 40.3 | 50.6 | 46.0 |

Onium I = Triphenyl benzyl phosphonium chloride
a = without onium
b = with onium The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A curable fluoropolymer composition comprising:
   a) hydrogen-containing fluoroelastomer having units of a cure-site monomer;

b) a peroxide curative;

c) optionally, a co-agent for the curative; and d) a non-fluorine-containing organo-onium compound.

2. The curable composition according to claim 1 wherein the fluoroelastomer is essentially free of vinylidene fluoride units.

3. The curable composition according to claim 2 wherein the composition is essentially free from one or more inorganic acid acceptors.

4. The curable composition according to claim 2 wherein the composition includes an inorganic acid acceptor.

5. The curable composition according to claim 1 wherein the fluoroelastomer includes vinylidene fluoride units.

6. The curable composition according to claim 1 wherein the fluoroelastomer further comprises pendant nitrile groups.

7. The curable composition according to claim 6 wherein the curative comprises an ammonia-generating compound.

8. The composition according to claim 1 further comprising a partially crystalline fluoropolymer.

9. The curable composition of claim 1, wherein the composition contains propylene units.

10. A curable fluoropolymer composition comprising:

a) a high purity, hydrogen-containing fluoroelastomer having units of a cure-site monomer;

b) a peroxide curative;

c) optionally, a co-agent for the curative; and d) a non-fluorine-containing organo-onium compound.

11. A curable composition according to claim 10, wherein upon curing, said composition results in a cured fluoropolymer having a high purity.

* * * * *